Patented Sept. 15, 1931

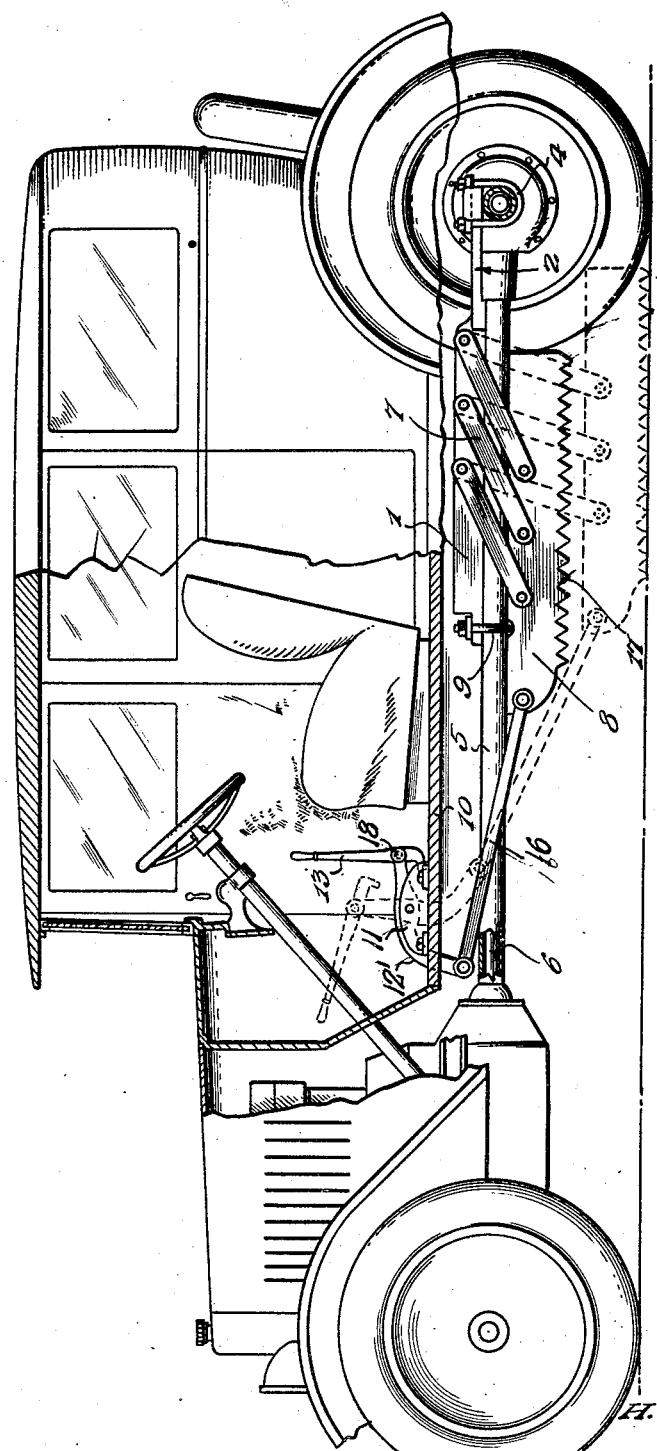

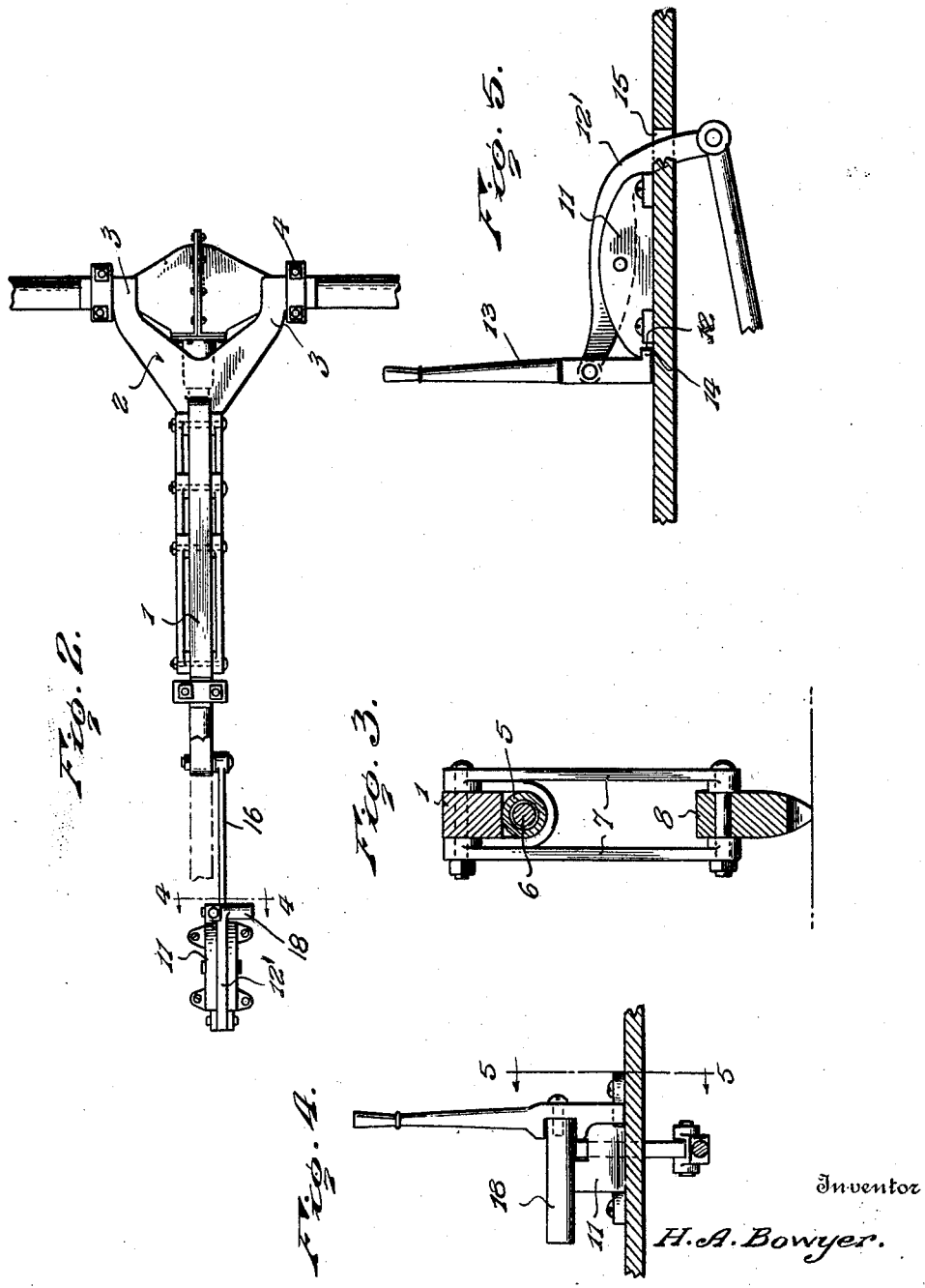

1,823,082

UNITED STATES PATENT OFFICE

HORACE A. BOWYER, OF ORWELL, OHIO, ASSIGNOR OF ONE-HALF TO CHARLES M. MIX, OF CLEVELAND, OHIO

ANTISKID DEVICE FOR AUTOMOBILES

Application filed January 11, 1928. Serial No. 245,998.

The primary object of the invention is to provide a device of this character so constructed that it can be easily installed upon an automobile, and when in place thereon is operable to not only prevent skidding of the automobile but can be used to prevent retrograde movement thereof on a hill.

Another object of the invention is to provide a device of this character which can be conveniently controlled by the driver, the construction being extremely simple, durable and efficient in operation.

With these and other objects in view, this invention resides in the novel features of construction, formation, combination and arrangement of parts to be hereinafter more fully described, claimed, and illustrated in the accompanying drawings, in which:

Figure 1 is a side elevation of an automobile, with parts broken away to more clearly illustrate the application of the device thereto.

Figure 2 is a fragmentary top plan view of the device.

Figure 3 is a vertical sectional view showing the device in its lowered position.

Figure 4 is a sectional view on the line 4—4 of Figure 2.

Figure 5 is a sectional view on the line 5—5 of Figure 4.

Referring to the drawings, the numeral 1 designates a beam carrying at its rear end a yoke 2, said yoke having its arms 3 secured to the rear axle housing by U-bolts 4, the forward end of said beam or bar being bolted to the tubular casing 5 which confines the drive shaft 6. It will be observed that this beam is thus fixed to the upper surface of the tubular casing 5.

Having their upper ends pivotally connected to the beam 1 are parallel links 7, preferably three in number, said links having their lower ends pivotally connected to the blade 8. It will be observed that the links are arranged in groups and upon opposite sides of the tubular casing 5. The forward end of the beam which, as hereinbefore mentioned, is fixed to the tubular casing 5, is connected thereto by a U-bolt 9.

Mounted upon the front floor board 10 is a block 11, said block having a recess 12 formed in its rear end, the purpose of which will be hereinafter explained. Pivotally connected to the block is an angle lever 12′, said lever having its rear end pivotally connected intermediate the ends of a latch bar 13, said latch bar having a lug 14 carried thereby for normally engaging the recess 12 to hold the lever 12′ against accidental movement. Upon reference to Figure 5, it will be noted that the lower end of the lever 12′ extends through an opening 15 formed in the floor board and has pivotally connected thereto the forward end of a link 16, the rear end of said link being connected to the forward end of the blade 8, said blade having its lower edge provided with a series of teeth 17 which serve to bite into the ground to aid in causing the device to be more effective in its operation.

The lever 12′ has its rear end provided with a laterally disposed pedal 18 which is so arranged that when the lever is released the driver can place his foot thereon in order to swing the lever in a direction to move the link 16 rearwardly, thus swinging the blade 8 to the position as indicated in dotted lines in Figure 1, so that the teeth thereof will bite into the ground and prevent skidding of the vehicle or to prevent the same from traveling backwardly upon a hill.

It will be obvious that when it is desired to use the device, the latch bar 13 is grasped and pushed forwardly in order that the lug 14 thereof will disengage the recess, whereupon by pushing forwardly thereon the lever will be rocked to a position to enable the driver to place his foot upon the pedal 18 to exert pressure thereon to lower the blade 8.

What is claimed is:

1. Motor vehicle anti-skid means including a beam secured upon the drive shaft housing, an anti-skid member beneath the drive shaft housing links at opposite sides of the beam and anti-skid member, pivoted at their ends to the beam and anti-skid member and forming connecting means therebetween, a block on the floor board of the vehicle extending longitudinally of the vehicle, a lever pivoted intermediate its length to said block intermediate the ends thereof, a link connecting the front end of the lever to the said anti-skid member, a latch bar pivoted near its lower end to the rear end of the lever and having a tooth at its lower end engageable with the said block to hold the anti-skid member inactive, and an arm extending transversely from the rear end of said lever serving as operating means to swing the lever forwardly when the latch bar is released from the block and throw the anti-skid member into action.

2. The combination with a motor vehicle including a drive shaft housing, a rear axle housing, and a differential housing at the junction of the drive shaft housing and rear axle housing of a beam extending longitudinally upon the drive shaft housing and having a yoke at its rear end straddling the differential housing and provided with opposing arms secured to the rear axle housing at opposite sides of the differential housing, an anti-skid member beneath the drive shaft housing, links at opposite sides of the beam and anti-skid member pivoted at their ends to the same and forming connecting means therebetween, an operating member readily accessible to the driver of the vehicle, and connecting means between the operating member and the said anti-skid member.

In testimony whereof I affix my signature.

HORACE A. BOWYER. [L. S.]